US010291731B2

(12) United States Patent
Huang (10) Patent No.: US 10,291,731 B2
(45) Date of Patent: May 14, 2019

(54) METHOD, CLIENT, AND SERVER FOR MESSAGE PUSHING OF WEBPAGE APPLICATION (71) Applicant: TENCENT TECHNOLOGY (SHENZHEN) COMPANY LIMITED, Shenzhen (CN)

(72) Inventor: Jiangquan Huang, Shenzhen (CN)

(73) Assignee: Tencent Technology (Shenzhen) Company Limited, Shenzhen (CN)

(*) Notice: Subject to any disclaimer, the term of this patent is extended or adjusted under 35 U.S.C. 154(b) by 203 days.

(21) Appl. No.: 15/175,462

(22) Filed: Jun. 7, 2016

(65) Prior Publication Data
US 2016/0285987 A1 Sep. 29, 2016

Related U.S. Application Data (63) Continuation of application No. PCT/CN2015/074166, filed on Mar. 13, 2015.

(30) Foreign Application Priority Data

Mar. 13, 2014 (CN) .......................... 2014 1 0093687

(51) Int. Cl.
G06F 15/16 (2006.01)
H04L 29/08 (2006.01)
H04L 12/58 (2006.01)

(52) U.S. Cl.
CPC .............. H04L 67/26 (2013.01); H04L 51/24 (2013.01); H04L 67/02 (2013.01)

(58) Field of Classification Search
CPC ......... H04L 67/26; H04L 51/10; H04L 67/02; H04L 67/10
See application file for complete search history.

(56) References Cited

U.S. PATENT DOCUMENTS 8,739,249 B1* 5/2014 Kay ..................... G06F 21/00
709/217
2003/0041178 A1 2/2003 Brouk et al.
(Continued)

FOREIGN PATENT DOCUMENTS

CN 101304563 A 11/2008
CN 101771709 A 7/2010
(Continued)

OTHER PUBLICATIONS

Search Report in International Application No. PCT/CN2015/074166 dated Jun. 17, 2015, 2 pages.
(Continued)

Primary Examiner — Liang Che A Wang
Assistant Examiner — Ayele F Woldemariam
(74) Attorney, Agent, or Firm — Oblon, McClelland, Maier & Neustadt, L.L.P.

(57) ABSTRACT

The present disclosure discloses a method, a client, and a server for message pushing of a webpage application. The method includes: displaying, by a client on a current page, a permission prompt for message pushing of a webpage application; reporting, to a server according to a response of a user to the permission prompt, permission state update information about message pushing of the webpage application; maintaining, by the server, a message pushing permission state of the webpage application on the server according to the reported permission state update information, and executing, according to the message pushing permission state, a message pushing operation which is in the webpage application and corresponds to the pushing permission state.

12 Claims, 6 Drawing Sheets (56) References Cited

U.S. PATENT DOCUMENTS

| | | | |
|---|---|---|---|
| 2009/0222925 A1* | 9/2009 | Hilaiel | G06F 21/53 726/25 |
| 2012/0210415 A1 | 8/2012 | Somani et al. | |
| 2013/0047034 A1* | 2/2013 | Salomon | H04W 4/00 709/217 |
| 2013/0246504 A1* | 9/2013 | Hu | H04L 67/26 709/203 |
| 2014/0095671 A1 | 4/2014 | Luo et al. | |
| 2014/0129622 A1* | 5/2014 | Michaeli | G06Q 10/10 709/203 |
| 2014/0337424 A1* | 11/2014 | Lee | H04L 63/0823 709/204 |
| 2014/0365853 A1* | 12/2014 | Kleinhout et al. | G06F 17/2235 707/737 |

FOREIGN PATENT DOCUMENTS

| | | |
|---|---|---|
| CN | 103001926 A | 3/2013 |
| CN | 103460674 A | 12/2013 |
| CN | 103517221 A | 1/2014 |
| CN | 103581249 A | 2/2014 |
| CN | 103634282 A | 3/2014 |

OTHER PUBLICATIONS

International Preliminary Report on Patentability and Written Opinion in International Application No. PCT/CN2015/074166 dated Sep. 13, 2016, 7 pages.
Office Action in CN Application No. 201410093687.8 dated Mar. 28, 2017, 7 pages.

* cited by examiner

METHOD, CLIENT, AND SERVER FOR MESSAGE PUSHING OF WEBPAGE APPLICATION

RELATED APPLICATIONS

This application is a continuation application of PCT Patent Application No. PCT/CN2015/074166, filed on Mar. 13, 2015, which claims priority to Chinese Patent Application No. 201410093687.8, filed on Mar. 13, 2014, both of which are incorporated by reference in their entirety.

FIELD OF THE TECHNOLOGY

The present disclosure relates to the field of webpage applications, and in particular, to a method, a client, and a server for message pushing of a webpage application.

BACKGROUND OF THE DISCLOSURE

When a user accesses the Internet by using a mobile terminal, it is very inconvenient to input a website address on the mobile terminal; a webpage application (which is also referred to as a webpage application program) displayed in the form of an icon provides a convenient and quick access portal for the user. Webpage applications are becoming one of the mainstream manners in which mobile terminal users acquire information and services.

Webpage applications usually release information such as special offer, sales promotion, and discount to mobile terminal users by means of message pushing. To prevent a webpage application from pushing too much information to a user and disturbing the user, a browser in a mobile terminal provides permission settings of message pushing of the webpage application. The message pushing permission of the webpage application is disabled by default, and the webpage application can push messages to a user only after the user actively enables message pushing; moreover, after the user disables message pushing of the webpage application, the user shall no longer receive messages pushed by the webpage application.

However, because most mobile terminal users know little about permission settings of message pushing of webpage applications, message pushing of many excellent webpage applications is seldom allowed.

SUMMARY

Embodiments of the present disclosure provide a method, a client, and a server for message pushing of a webpage application, so as to address the challenges where message pushing of most webpage applications is not allowed because a client knows little about permission settings of message pushing of webpage applications in the existing technology.

According to an aspect of the embodiments of the present disclosure, a method for message pushing of a webpage application is provided, including: displaying, by a client on a current page, a permission prompt for message pushing of a webpage application; reporting, by the client to a server according to a response of a user to the permission prompt, permission state update information about message pushing of the webpage application; maintaining, by the server according to the reported permission state update information, a message pushing permission state of the webpage application on the server, and executing, according to the message pushing permission state, a message pushing operation which is in the webpage application and corresponds to the pushing permission state.

According to various embodiments of the present disclosure, a client for message pushing of a webpage application is further provided, including: one or more processors; and memory storing a plurality of modules consisting of instructions for executing by the one or more processors, the plurality of modules including: a permission display module, to display, on a current page, a permission prompt for message pushing of a webpage application; a report module, to report, to a server according to a response of a user to the permission prompt, permission state update information about message pushing of the webpage application, so that the server maintains, according to the reported permission state update information, a message pushing permission state of the webpage application, so as to execute, according to the message pushing permission state, a message pushing operation which is in the webpage application and corresponds to the pushing permission state.

According to various embodiments of the present application, a server for message pushing of a webpage application is further provided, including: one or more processors; and memory storing a plurality of modules consisting of instructions for executing by the one or more processors, the plurality of modules including: a receiving module, to receive permission state update information, reported by a client, for message pushing of a webpage application; and a pushing module, to maintain, on the server according to the permission state update information, a message pushing permission state of the webpage application, and execute, according to the message pushing permission state, a message pushing operation which is in the webpage application and corresponds to the pushing permission state.

In the embodiments of the present disclosure, a message pushing permission state of a webpage application of each client is maintained on a server, the client displays, to a user, a message pushing permission prompt delivered by the server, and the user confirms the message pushing permission, so that a permission setting manner for message pushing of the webpage application becomes easy and intuitive, thereby solving the technical issue that message pushing of most webpage applications is not allowed because the client knows little about permission settings of message pushing of webpage applications in the existing technology.

BRIEF DESCRIPTION OF THE DRAWINGS

The accompanying drawings described herein are used to provide further comprehension of the present disclosure, and is a part of the present application. Schematic embodiments of the present disclosure and the description thereof are used to illustrate the present disclosure, but do not constitute any improper limitation on the present disclosure. In the accompanying drawings.

DESCRIPTION OF EMBODIMENTS

It should be noted that, unless conflicting each other, embodiments in the present application and features in the embodiments can be combined. The following describes the present application in detail with reference to the accompanying drawings and the embodiments.

In the description that follows, unless otherwise specified, the specific embodiments of the present disclosure will be described with reference to symbols of actions and operations that are performed by one or more computers. The computer includes, but is not limited to, various products such as a personal computer (PC), a server, and a mobile terminal, and all devices having a processing chip such as a central processing unit (CPU), a single-chip microcomputer, and a digital signal processor (DSP) can be referred to as computers. As such, it will be understood that such actions and operations, which are at times referred to as being computer-executed, include the manipulation by a processing unit of a computer over electrical signals representing data in a structured form. This manipulation transforms the data or maintains it at locations in the memory system of the computer, which reconfigures or otherwise alters the operation of the computer. The data structures where data is maintained are physical locations of the memory that have particular properties defined by the format of the data. However, while the principle of the present disclosure is described in the foregoing context, the present disclosure is not limited thereto, and various actions and operations described hereinafter may also be implemented in hardware.

Refer to the figures, in which identical reference symbols indicate identical elements. The principle of the present disclosure is illustrated as that the present disclosure is implemented in a suitable computing environment. The following description is made based on the embodiments of the present disclosure, and shall not be construed as alternative embodiments that are not detailed here, or construed as to limit the present application.

Figure 1:
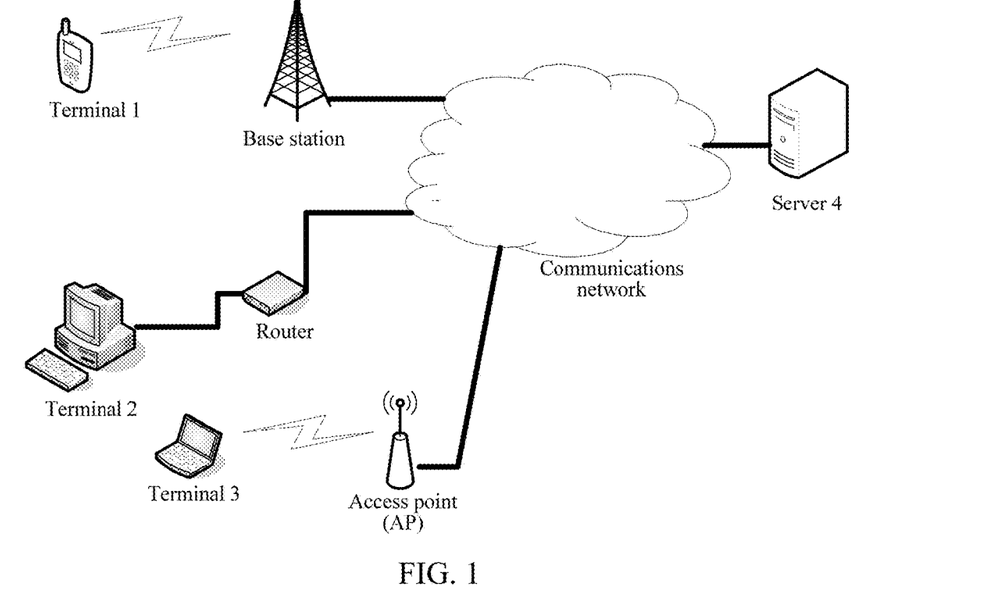
FIG. 1 is a schematic diagram of an environment for interaction between a terminal and a server according to an embodiment of the present disclosure.

The following embodiments may be applied to a computer, for example, to a PC, and may also be applied to a current mobile terminal that uses an intelligent operating system; the application is not limited thereto. FIG. 1 is a schematic diagram of an environment for interaction between a terminal and a server according to an embodiment of the present disclosure. As shown in FIG. 1, the terminal and the server exchange information by using a communications network. The terminal may be a mobile terminal, a home computer, a portable computer, or the like, for example, terminal 1, terminal 2, and terminal 3 shown in the figure. An operating system of the computer or mobile terminal does not need to satisfy any special requirement, as long as the computer or mobile terminal can detect a touch, determine whether the touch meets a predetermined rule, and implement a corresponding function according to an attribute of the touch. The terminal may access the communications network in various wired or wireless manners, for example, a wireless base station, a router, and an access point (AP). The communications network may be the Internet, a private network, a distributed network, or the like. A communications protocol used on the communications network does not need to satisfy any special requirement, as long as the communications network can transmit data information. It should be noted that, the environment for interaction between the terminal and the server shown in FIG. 1 is merely schematic, and does not limit the present disclosure.

Embodiment 1

According to this embodiment of the present disclosure, a method for message pushing of a webpage application is provided. It should be noted that, the webpage application involved in this embodiment may take various forms, for example, "novel bookshelf", "weather", and "jokes" added on a desktop of a QQ browser in a mobile phone, and definitely, the webpage application is not limited to those on a mobile phone platform, and may also be a webpage application running on another platform.

Figure 2:
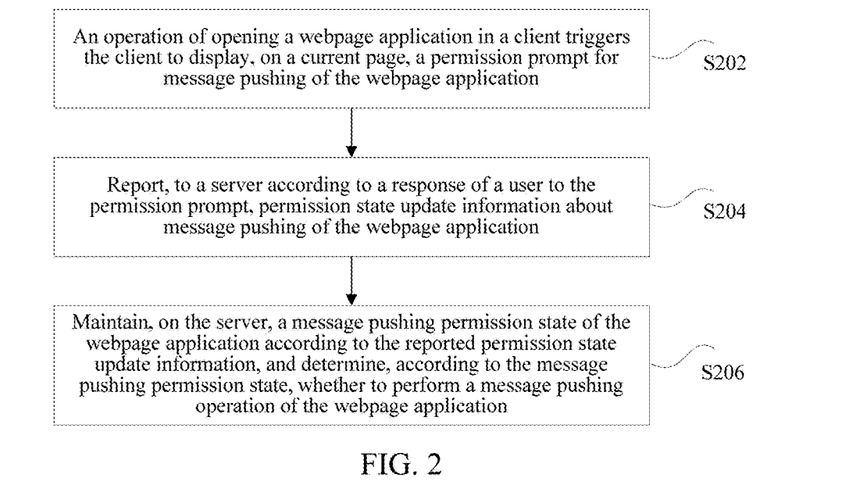
FIG. 2 is a flowchart of a method for message pushing of a webpage application according to Embodiment 1 of the present disclosure.

As shown in FIG. 2, the method for message pushing of a webpage application includes the following steps:

Step S202: A client displays, on a current page, a permission prompt for message pushing of a webpage application.

Step S204: The client reports, to a server according to a response of a user to the permission prompt, permission state update information about message pushing of the webpage application.

Step S206: The server maintains a message pushing permission state of the webpage application on the server according to the reported permission state update information, and executes, according to the message pushing permission state, a message pushing operation which is in the webpage application and corresponds to the pushing permission state.

In this embodiment, a message pushing permission state of a webpage application of each client is maintained on the server, the client displays, to a user, a message pushing permission prompt delivered by the server, and the user confirms message pushing permission, so that a permission setting manner for message pushing of the webpage application becomes easy and intuitive, thereby solving the technical issue that message pushing of most webpage applications is not allowed because the client knows little about permission settings of message pushing of webpage applications in the existing technology.

In the foregoing embodiment, the server delivers an XML-format permission prompt to the client; the client parses the XML-format permission prompt, and therefore effects such as bold, change of color, and line feed of some texts can be supported. The client displays, on the current page, text content of the permission prompt and a permission button widget. The text content may be used for asking the user whether to accept message pushing, for example, in some information webpage applications, the following text content may be displayed: "Allow daily news pushing, and obtain latest headlines in first time". The permission button widget may include a confirm button indicating that the user accepts message pushing and a close button indicating that the user does not accept message pushing. Definitely, the permission button widget may also be widgets in other forms. If the user clicks an "allow" button, it is considered that the user accepts messages pushed by the webpage application, and the client reports such information to the server; if the user clicks the "close" button, it is considered that the user refuses to receive messages pushed by the webpage application, and the terminal also reports to the server.

In the foregoing embodiment, multiple webpage applications are provided, server delivers a permission prompt list for message pushing of multiple webpage applications, and the client displays the permission prompt list to the user.

In the foregoing embodiment, the message pushing permission state includes message pushing accepted and message pushing not accepted. When the message pushing permission state of the webpage application is message pushing accepted, the server pushes a message of the webpage application to the client; when the message pushing permission state of the webpage application is message pushing not accepted, the server disables the function of pushing a message of the webpage application to the client.

After step S206 of the foregoing embodiment, the method further includes: displaying the pushed message in a system notification bar of the client when a browser of the client is in the background; and displaying the pushed message in a webpage application icon of the browser when the browser of the client is in the foreground.

In the foregoing embodiment, when the client is triggered, according to the response of the user to the permission prompt, to report the permission state update information about message pushing of the webpage application to the server, an update of the message pushing permission state of the webpage application may also be saved in the client at the same time. Before the pushed message is displayed in the system notification bar of the client or the webpage application icon of the browser, the message pushing permission state of the webpage application saved in the client is checked, and when the message pushing permission state of the webpage application saved in the client is message pushing not accepted, the message pushed by the webpage application is discarded.

After the user changes the message permission state of the webpage application, the client synchronizes the change with the server, and the server determines, according to change information reported by the terminal, whether to deliver the message pushed by the webpage application. However, due to the uncertainty of the network, after the user disables message pushing of some webpage applications, messages sent by the client to the server may fail to reach the server for various reasons, and the server continues to push, to the client, messages from the webpage applications of which message pushing has been disabled, which disturbs the user and leads to a poor user experience. In this embodiment, after receiving the message pushed by the server and before displaying the message, the terminal checks the pushing permission state of the message, and the check is carried out on the basis of the message pushing permission information of the webpage application saved locally in the client. If the local pushing permission state of the message is "off", the client discards the message, and the message is not displayed on the client.

In the foregoing embodiment, the client may be a mobile terminal, and definitely, may also be any terminal capable of interacting with the server and capable of running a corresponding webpage application program.

It should be noted that, in order to simplify the description of the forgoing method embodiment, the embodiment is expressed as a series of action combinations; however, the present disclosure is not limited by the described action sequence, because according to the present disclosure, some steps may be performed according to another sequence or performed at the same time.

Through the description of the foregoing implementation manner, the method according to the foregoing embodiment may be accomplished by software on necessary universal hardware platforms, and definitely may also be accomplished by hardware, but in most cases, the former is a more preferable implementation manner. Based on such an understanding, the technical solution of the present disclosure, or in other words, the part that makes contributions to the existing technology can be embodied in the form of a software product. The computer software product may be stored in a storage media (such as a read-only memory (ROM)/random access memory (RAM), a magnetic disk, or an optical disc), and includes several instructions to cause a terminal device (which may be a mobile phone, a computer, a server, or a network device) to perform the method according to the embodiments of the present disclosure.

Embodiment 2

Figure 3:
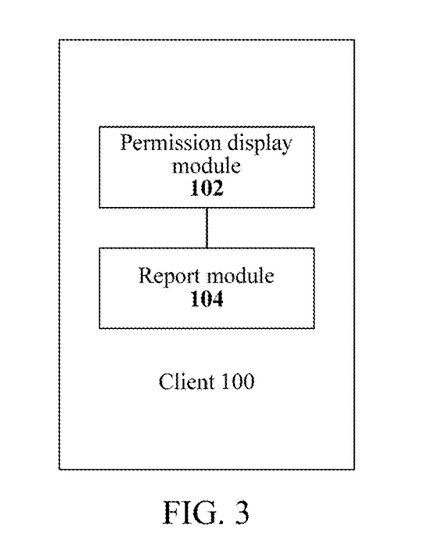
FIG. 3 is a schematic diagram of a modular structure of a client for message pushing of a webpage application according to Embodiment 2 of the present disclosure.

According to this embodiment of the present disclosure, a client 100 for implementing the foregoing message pushing of a webpage application is further provided. In this embodiment, the client may be a mobile terminal, and definitely, may also be any terminal capable of interacting with a server and capable of running a corresponding webpage application program. As shown in FIG. 3, the client 100 includes a permission display module 102 and a report module 104 that are coupled to each other.

The permission display module 102 is configured to display, on a current page of the client, a permission prompt for message pushing of a webpage application. The report module 104 is configured to report, to a server according to a response of a user to the permission prompt, permission state update information about message pushing of the webpage application, so that the server maintains a message pushing permission state of the webpage application according to the permission state update information, so as to execute a message pushing operation which is in the webpage application and corresponds to the pushing permission state.

In this embodiment, the permission display module 102 displays, to a user, a message pushing permission prompt delivered by the server, and the user confirms message pushing permission, so that a permission setting manner for message pushing of the webpage application becomes easy and intuitive, thereby solving the technical issue that message pushing of most webpage applications is not allowed because the client knows little about permission settings of message pushing of webpage applications in the existing technology.

The display module 102 further includes: an acquiring sub-module 1022, configured to acquire an XML-format permission prompt delivered by the server; and a parsing sub-module 1024, configured to parse the XML-format permission prompt, and display, on the current page, text content of the permission prompt and a permission button widget.

Therefore, the XML-format permission prompt can support effects such as bold, change of color, and line feed of some texts. The text content may be used for asking the user whether to accept message pushing, for example, in some information webpage applications, the following text content may be displayed: "Allow daily news pushing, and obtain latest headlines in first time". The permission button widget may include a confirm button indicating that a user accepts message pushing and a close button indicating that the user does not accept message pushing. Definitely, the permission button widget may also be widgets in other forms. If the user clicks an "allow" button, it is considered that the user accepts messages pushed by the webpage application, and the terminal reports such information to the server; if the user clicks the "close" button, it is considered that the user refuses to receive messages pushed by the webpage application, and the terminal also reports to the server.

Multiple webpage applications may be provided, and correspondingly, the server delivers a permission prompt list for message pushing of multiple webpage applications.

The client for message pushing of a webpage application further includes: a message display module 106, configured to display the message pushed in a system notification bar of the client when a browser of the client is in the background; and display the pushed message in a webpage application icon of the browser when the browser of the client is in the foreground.

The client for message pushing of a webpage application further includes: a saving module 108, configured to save, on the client according to the response of the user to the permission prompt, an update of the message pushing permission state of the webpage application; and a checking module 110, configured to check a message pushing permission state, saved in the client, of the webpage application, and discard the message pushed by the webpage application when the message pushing permission state, saved in the client, of the webpage application is message pushing not accepted.

After the user changes the message permission state of the webpage application, the client synchronizes the change with the server, and the server determines, according to change information reported by the terminal, whether to deliver the message pushed by the webpage application. However, due to the uncertainty of the network, after the user disables message pushing of some webpage applications, messages sent by the client to the server may fail to reach the server for various reasons, and the server continues to push, to the client, messages from the webpage applications of which message pushing has been disabled, which disturbs the user and leads to a poor user experience. In this embodiment, after receiving the message pushed by the server and before displaying the message, the terminal checks the pushing permission state of the message, and the check is carried out on the basis of the message pushing permission information of the webpage application saved locally in the client. If the local pushing permission state of the message is "off", the client discards the message, and the message is not displayed on the client.

In the foregoing embodiment, it should be understood that, the disclosed client may be implemented in other manners. The apparatus embodiment described above is merely schematic. For example, the division of modules is merely a logical function division, and there may be other division manners in actual implementation. For example, multiple modules may be combined or integrated into another system. In addition, the displayed or discussed couplings or direct couplings or communication connections may be indirect couplings or communication connections through some interfaces, apparatuses or units, and may be electric or in other forms.

Embodiment 3

Figure 4:
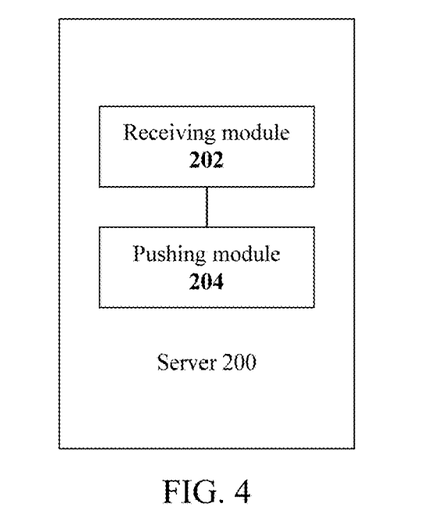
FIG. 4 is a schematic diagram of a modular structure of a server for message pushing of a webpage application according to Embodiment 3 of the present disclosure.

According to this embodiment of the present disclosure, a server for implementing the foregoing message pushing of a webpage application is further provided. In this embodiment, the server may be a mobile terminal, and definitely, may be any device, such as a PC or a private server, capable of interacting with a client. As shown in FIG. 4, the server 200 includes a receiving module 202 and a pushing module 204 that are coupled with each other.

The receiving module 202 is configured to receive permission state update information, reported by a client, for message pushing of a webpage application. The pushing module 204 is configured to maintain, on the server, a message pushing permission state of the webpage application according to the permission state update information, and execute, according to the message pushing permission state, a message pushing operation which is in the webpage application and corresponds to the pushing permission state.

In this embodiment, the server 200 maintains a message pushing permission state of a webpage application of each client, a message pushing permission prompt delivered by the server 200 is displayed to a user, and the user confirms message pushing permission, so that a permission setting manner for message pushing of the webpage application becomes easy and intuitive, thereby solving the technical issue that message pushing of most webpage applications is not allowed because the client knows little about permission settings of message pushing of webpage applications in the existing technology.

The server 200 further includes: a permission delivering module 206, configured to deliver, to the client, a permission prompt for message pushing of the webpage application, so that the user of the client determines, according to the permission prompt, whether to receive a message pushed by the webpage application.

In this embodiment, in order to improve a control capability of the server, content of the permission prompt and a text of an "allow" button are both delivered by the server, where the content is delivered in the format of XML, and the terminal parses and displays the content, so that effects such as bold, change of color, and line feed of some texts can be supported.

Multiple webpage applications may be provided, and correspondingly, the server 200 delivers a permission prompt list for message pushing of multiple webpage applications.

In the foregoing embodiment, on/off state information about message pushing of a webpage application is maintained on a server; a terminal acquires a push on/off state list from the server, and reports a permission state changed by the user; the terminal delivers a message and button content of the message pushing permission prompt. The message pushing state and permission prompt content are maintained and configured by the server, so that management and control by the cloud over messages pushed to the terminal can be implemented, thereby enhancing the operability while improving the user experience.

It should be noted that, the modules of the client or server described in the foregoing embodiment may be implemented by using software or hardware. The modules of the client or server described in the foregoing embodiment may also be disposed in a processor, and in some cases, names of these modules do not limit the modules.

Embodiment 4

Figure 5:
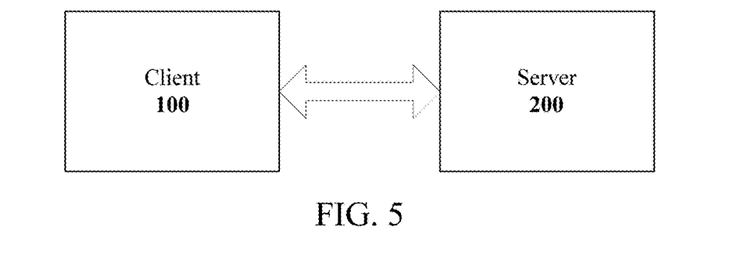
FIG. 5 is a schematic diagram of interaction in a system for message pushing of a webpage application according to Embodiment 4 of the present disclosure.
Figure 6:
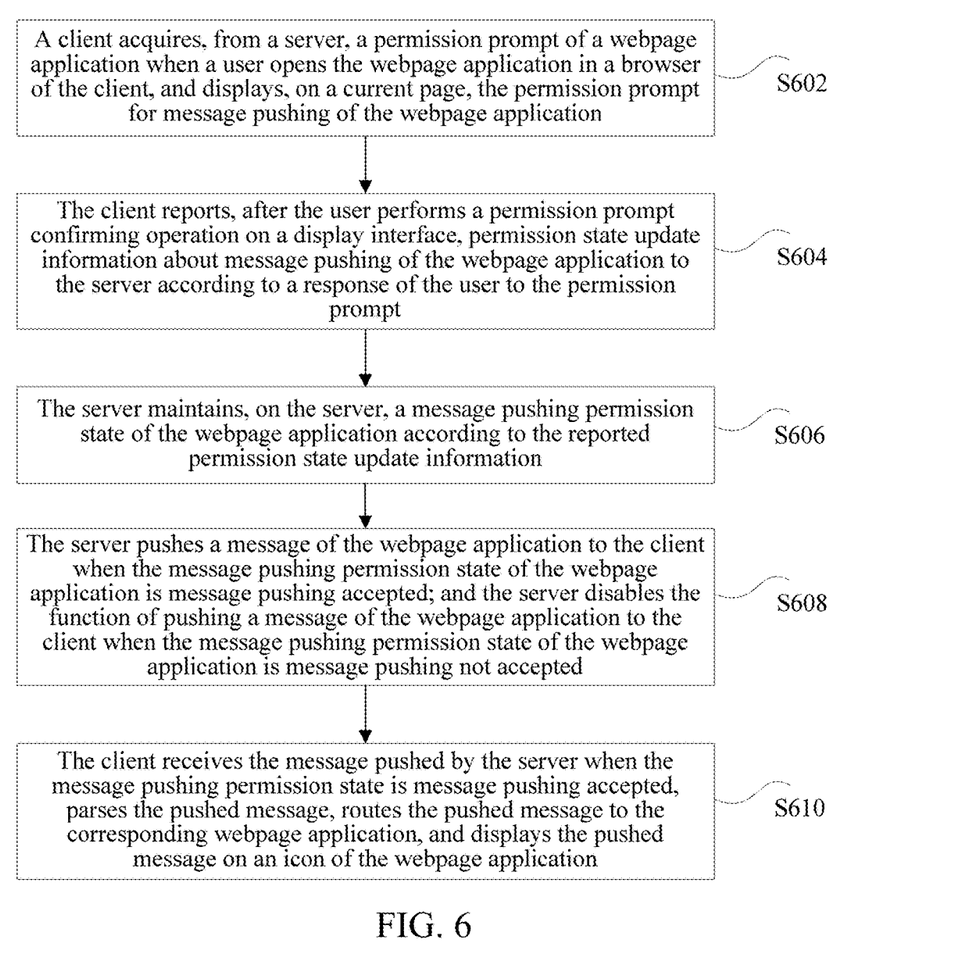
FIG. 6 is a flowchart of interaction in a system for message pushing of a webpage application according to Embodiment 4 of the present disclosure.

According to this embodiment of the present disclosure, a system for implementing the foregoing message pushing of a webpage application is further provided. As shown in FIG. 5, the system includes the client 100 and the server 200 described above. The client 100 and the server 200 interact with each other in a wired manner or a wireless manner. An optimized manner of permitting message pushing of a webpage application is implemented by means of interaction between the client 100 and the server 200. The interaction between the client 100 and the server 200 is shown in FIG. 6, and includes the following steps:

Step S602: A client acquires, from a server, a permission prompt of a webpage application when a user opens the webpage application in a browser of the client, and displays, on a current page, the permission prompt for message pushing of the webpage application.

The permission prompt is delivered by the server in the format of XML, and is parsed and displayed by the terminal. Therefore, effects such as bold, change of color, and line feed of some texts can be supported.

Step S604: The client reports, after the user performs a permission prompt confirming operation on a display interface, permission state update information about message pushing of the webpage application to the server according to a response of the user to the permission prompt.

For example, if the user clicks an "allow" button, it is considered that the user accepts messages pushed by the webpage application, and the client reports such information to the server; if the user clicks a "close" button, it is considered that the user refuses to receive messages pushed by the webpage application, and the client also reports to the server.

Step S606: The server maintains, on the server, a message pushing permission state of the webpage application according to the reported permission state update information. The server saves a list of message pushing permission states of webpage applications, and correspondingly updates the permission state list according to a latest permission state reported.

Step S608: The server pushes a message of the webpage application to the client when the message pushing permission state of the webpage application is message pushing accepted; and the server disables the function of pushing a message of the webpage application to the client when the message pushing permission state of the webpage application is message pushing not accepted.

Step S610: The client receives the message pushed by the server when the message pushing permission state is message pushing accepted, parses the pushed message, routes the pushed message to the corresponding webpage application, and displays the pushed message on an icon of the webpage application.

In the foregoing embodiment, the server delivers the XML-format permission prompt to the client; the client parses the XML-format permission prompt, and therefore, effects such as bold, change of color, and line feed of some texts can be supported. The client displays, on the current page, text content of the permission prompt and a permission button widget. The text content may be used for asking the user whether to accept message pushing, for example, in some information webpage applications, the following text content may be displayed: "Allow daily news pushing, and obtain latest headlines in first time". The permission button widget may include a confirm button indicating that the user accepts message pushing and a close button indicating that the user does not accept message pushing. Definitely, the permission button widget may also be widgets in other forms. If the user clicks an "allow" button, it is considered that the user accepts messages pushed by the webpage application, and the client reports such information to the server; if the user clicks the "close" button, it is considered that the user refuses to receive messages pushed by the webpage application, and the terminal also reports to the server.

In the foregoing embodiment, multiple webpage applications are provided, the server delivers a permission prompt list for message pushing of multiple webpage applications, and the client displays the permission prompt list to the user.

In the foregoing embodiment, the message pushing permission state includes message pushing accepted and message pushing not accepted. When the message pushing permission state of the webpage application is message pushing accepted, the server pushes a message of the webpage application to the client; when the message pushing permission state of the webpage application is message pushing not accepted, the server disables the function of pushing a message of the webpage application to the client.

In step S610, the pushed message is displayed in a system notification bar of the client when a browser of the client is in the background; and the pushed message is displayed in a webpage application icon of the browser when the browser of the client is in the foreground.

In the foregoing embodiment, when the client is triggered, according to the response of the user to the permission prompt, to report the permission state update information about message pushing of the webpage application to the server, an update of the message pushing permission state of the webpage application may also be saved in the client at the same time. Before the pushed message is displayed in the system notification bar of the client or the webpage application icon of the browser, the message pushing permission state of the webpage application saved in the client is checked, and when the message pushing permission state of the webpage application saved in the client is message pushing not accepted, the message pushed by the webpage application is discarded.

After the user changes the message permission state of the webpage application, the client synchronizes the change with the server, and the server determines, according to change information reported by the terminal, whether to deliver the message pushed by the webpage application. However, due to the uncertainty of the network, after the user disables message pushing of some webpage applications, messages sent by the client to the server may fail to reach the server for various reasons, and the server continues to push, to the client, messages from the webpage applications of which message pushing has been disabled, which disturbs the user and leads to a poor user experience. In this embodiment, after receiving the message pushed by the server and before displaying the message, the terminal checks the pushing permission state of the message, and the check is carried out on the basis of the message pushing permission information of the webpage application saved locally in the client. If the local pushing permission state of the message is "off", the client discards the message, and the message is not displayed on the client.

The client and server in this embodiment may be operated by using other general-purpose or application-specific computing or communication environments or configurations. Examples of common computing systems, environments, and configurations applicable to the present application include, but are not limited to, a PC, a server, a multi-processor system, a microprocessor based system, a microcomputer, a mainframe computer, an intelligent device, a terminal (including a mobile terminal), and a distributed computing environment including any one of the foregoing systems or devices.

Embodiment 5

This embodiment provides detailed description by using webpage application message pushing actually applied in a mobile terminal as an example.

In this embodiment, the following manner for message pushing of a webpage application is used:

After a webpage application is opened in a browser, a piece of JavaScript code in the webpage application invokes a local interface of the browser, so as to register with a server; the server records an identity state of the webpage application and an identification code of a user of the browser.

When the browser is in the foreground, an internal pull process of the browser regularly requests, from the background server, data pushed by the webpage application, and if the webpage application that has been registered with the background has a message update, the background server returns a pushed data packet to the browser. The browser parses the update data packet to obtain a message pushed by the webpage application, then routes the message to the corresponding webpage application, and displays the message on an icon of the webpage application.

When the browser is in the background, after detecting a pushed message, the server uses a system-level message pushing method provided by an operating system of the terminal to push the message to the system of the terminal, and the system of the terminal receives and displays the message.

It can be learned from the above description that, this embodiment provides two message pushing manners: an icon message in the browser and a message in the system notification bar of the terminal.

Figure 7:
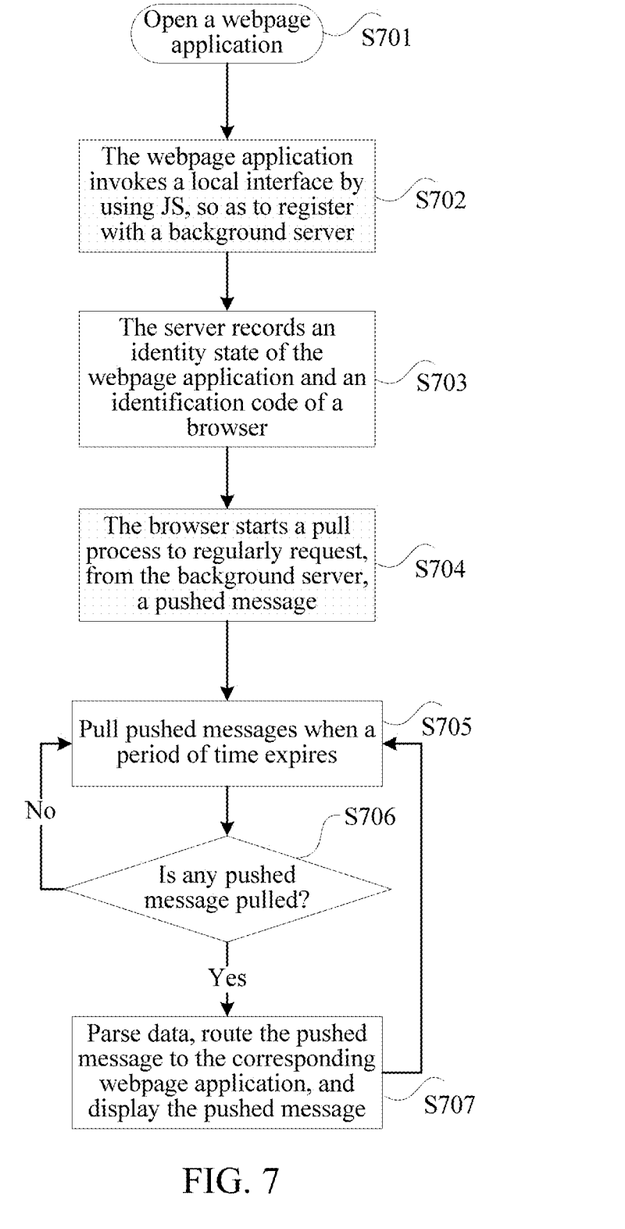
FIG. 7 is a flowchart of message pushing according to Embodiment 5 of the present disclosure.

A specific message pushing process is shown in FIG. 7, including the following steps:

Step S701: Open a webpage application in a browser of a client.

Step S702: The webpage application invokes a local interface of the browser by using JavaScript code, so as to register with a background server.

Step S703: The server records an identity state of the webpage application and an identification code of a user of the browser.

Step S704: The browser starts a pull process to regularly request, from the background server, a message pushed by the webpage application.

Step S705: Pull pushed messages in a preset period of time.

Step S706: Determine whether a pushed message is pulled, if no pushed message is pulled, perform step S705 to continue to pull pushed messages in a preset period of time, or if a pushed message is pulled, perform step S707.

Step S707: Parse the pushed message, route the pushed message to the corresponding webpage application, and display the pushed message on an icon of the webpage application.

This embodiment uses the following permission prompt and permission management manner for the webpage application:

To prevent the webpage application from pushing too much information to the user and disturbing the user, the message pushing permission of the webpage application is disabled by default, and the webpage application is allowed to push messages to the user only after the user actively enables message pushing. Moreover, after the user disables message pushing of the webpage application, the user shall no longer receive messages pushed by the webpage application.

In this embodiment, the user may enable message pushing of the webpage application mainly in the following two approaches:

Approach 1: Enter the "system settings-→message management" interface by using the browser. In this interface, the user can check and manage message pushing permissions of all webpage applications installed in the browser.

Figure 8:
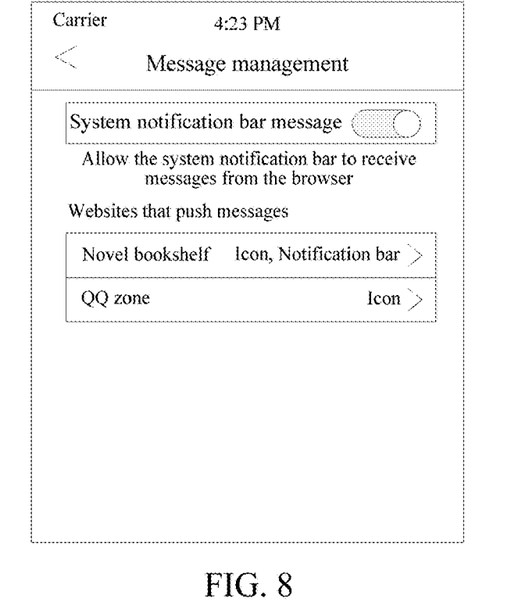
FIG. 8 is a screenshot of a mobile phone interface for management of message pushing permission according to Embodiment 5 of the present disclosure.
Figure 9:
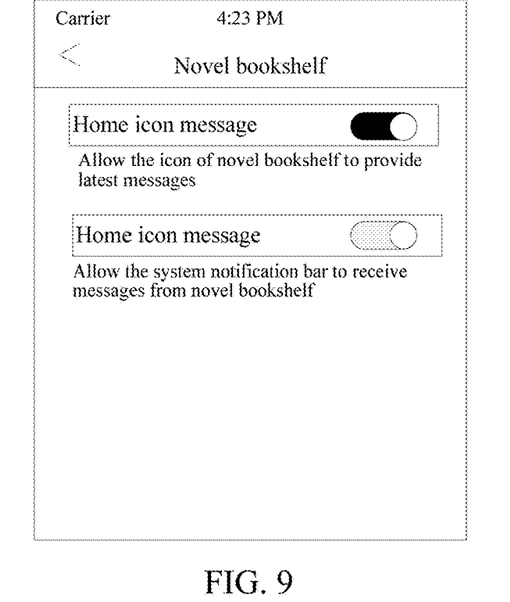
FIG. 9 is another screenshot of a mobile phone interface for management of message pushing permission according to Embodiment 5 of the present disclosure.

As shown in FIG. 8 and FIG. 9, the left side is a primary interface of message management, and the right side is a secondary interface of message management after the user opens a webpage application "novel bookshelf". The webpage application list in the primary interface is pulled from the server; after the permission state of the webpage application is changed in the secondary interface, the message pushing permission state of "novel bookshelf" on the server is updated with the changed permission state by using a protocol of the client.

Approach 2: When a webpage application is opened, the background pushes a message permission prompt of the webpage application, and the terminal displays the permission prompt on the current page and waits for a response of the user. In order to improve a control capability of the cloud, content of the permission prompt and a text of an "allow" button are both delivered by the server, where the content is delivered in the format of XML, and the terminal parses and displays the content, so that effects such as bold, change of color, and line feed of some texts can be supported.

If the user clicks the "allow" button, it is considered that the user accepts messages pushed by the webpage application, and the terminal reports such information to the server; if the user clicks a "close" button, it is considered that the user refuses to receive messages pushed by the webpage application, and the terminal also reports to the server.

Figure 10:
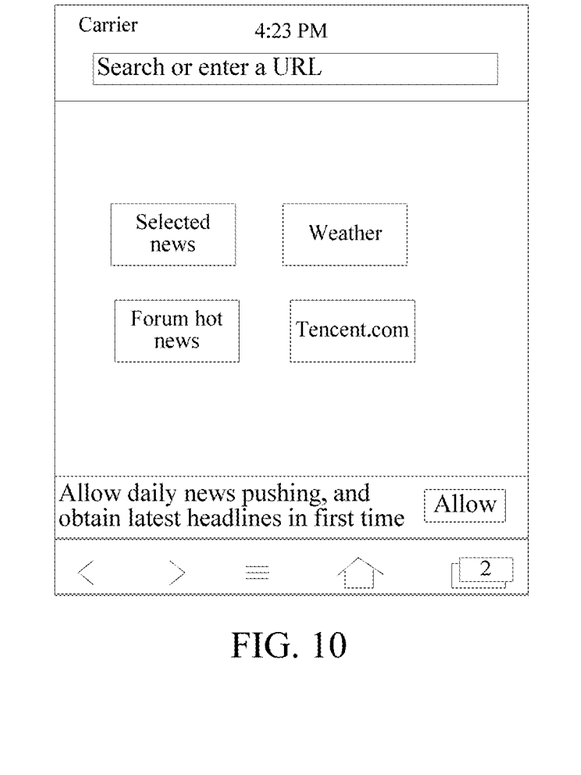
FIG. 10 is a screenshot of a mobile phone interface for display of message pushing permission according to Embodiment 5 of the present disclosure.

As shown in FIG. 10, webpage applications on a desktop of a QQ browser of the mobile phone include "selected news", "forum hot news", "Tencent.com", and the like. The permission prompt displayed below icons of the webpage applications includes: text content "Allow daily news pushing, and obtain latest headlines in first time", a confirm button indicating that the user accepts message pushing and a close button indicating that the user does not accept message pushing. If the user clicks the "allow" button, it is considered that the user accepts messages pushed by the webpage application, and the terminal reports such information to the server; if the user clicks the "close" button, it is considered that the user refuses to receive messages pushed by the webpage application, and the terminal also reports to the server.

In this embodiment, if the user needs to alter the choice made in the message permission prompt, the user may enter the "system settings-→message management" interface to perform a complete operation.

After the user changes the message permission state of the webpage application, the terminal synchronizes the change with the server, and the server determines, according to change information reported by the terminal, whether to deliver the message pushed by the webpage application.

However, due to the uncertainty of the network, after the user disables message pushing of some webpage applications, messages sent by the client to the server may fail to reach the server for various reasons, and the server continues to push, to the client, messages from the webpage applications of which message pushing has been disabled, which disturbs the user and leads to a poor user experience.

In this embodiment, after receiving the message pushed by the server and before displaying the message, the terminal checks the pushing permission state of the message, and the check is carried out on the basis of the message pushing permission information, saved locally on the terminal, of the webpage application. If the local pushing permission state of the message is "off", the terminal discards the message, and the message is not displayed on the terminal. In this way, further protection measures can be taken on the terminal side.

The sequence numbers of the foregoing embodiments of the present disclosure are merely for the convenience of description, and do not imply the preference among the embodiments.

In the foregoing embodiments of the present disclosure, description of each embodiment focuses on a different part, and for a part that is not described in detail in one embodiment, reference may be made to the related description of other embodiments.

It should be noted that, the steps shown in the flowcharts of the accompanying drawings may be executed in a computer system such as a group of computer executable instructions. Moreover, although a logic sequence is shown in the flowchart, in some cases, the shown or described steps may be executed according to a sequence different from that shown herein.

In another preferred embodiment of the present application, a carrier for executing a computer program in the foregoing embodiment and saving the computer program may further be provided, that is, the foregoing embodiment of the present application may use a proper computer system structure to perform a running process that conforms to the natural law. In addition, although the present application is described in the context above, the foregoing computer program for implementing execution of steps is not intended to limit the present application, and aspects of the described actions and operations may also be implemented by hardware.

It can be seen from the above description that, the present application achieves the following technical effects:

A cloud-controlled technical solution for message management and interaction of a webpage application is implemented. A terminal reports a change in a message receiving on/off state of the webpage application to a server, so as to maintain, on the server, a message receiving permission state of a webpage application of each terminal; the terminal may acquire a permission information list from the server, display the list to a user, accepts an operation of the user, and reports the operation to the server; the server may effectively push messages, which are allowed by the user, according to permission state information of each application, so as to improve a user permission rate, and improve user stickiness.

The foregoing modules or steps in the present application may be implemented by a general-purpose computing apparatus, and may be centralized on a single computing apparatus or distributed in a network consisting of multiple computing apparatuses. Optionally, the modules or steps may be implemented by computing apparatus executable program code, so as to be stored in a storage apparatus and executed by the computing apparatus, or implemented by separately manufacturing the modules or steps as integrated circuit modules, or by manufacturing multiple modules or steps among the modules or steps as a single integrated circuit module. In this way, the present application is not limited to any specific combination of hardware and software.

The foregoing descriptions are merely preferred embodiments of the present application, but are not intended to limit the present application. A person skilled in the art may make various alterations and variations. Any modification, equivalent replacement, or improvement made within the spirit and principle of the present application shall fall within the protection scope of the present application.

What is claimed is:

1. A method for message pushing of a webpage application, comprising:
   displaying, by a first computing device acting as a client on a current page, a permission prompt for message pushing of the webpage application, wherein the webpage application is displayed in a form of an icon;
   reporting, by the first computing device acting as the client to a second computing device acting as a server according to a response of a user to the permission prompt, permission state update information about message pushing of the webpage application;
   saving, by the first computing device acting as the client according to the response of the user to the permission prompt and on the client locally, an update of a local message pushing permission state of the webpage application;
   maintaining, by the second computing device acting as the server, a remote message pushing permission state of the webpage application on the server according to the reported permission state update information, and executing, according to the remote message pushing permission state, a message pushing operation which is in the webpage application and corresponds to the remote message pushing permission state;
   checking, by the first computing device acting as the client, the local message pushing permission state, saved locally on the client, of the webpage application, and discarding the message pushed by the webpage application when the local message pushing permission state, saved locally on the client, of the webpage application has been changed to message pushing not accepted and is inconsistent with the remote message pushing permission state maintained by the server;
   displaying, by the first computing device acting as the client, a message pushed by the second computing device acting as the server in a system notification bar of an operating system installed on the client when a browser of the client run by the operating system is not displayed in the foreground; and
   displaying the pushed message in the icon of the webpage application displayed within the browser when the browser of the client is displayed in the foreground.

2. The method for message pushing of the webpage application according to claim 1, wherein the displaying, by the first computing device acting as the client on the current page, the permission prompt for message pushing of the webpage application comprises:

acquiring, by the first computing device acting as the client, the permission prompt delivered by the server; and parsing, by the first computing device acting as the client, the permission prompt, and displaying, on the current page, text content of the permission prompt and a permission button widget.

3. The method for message pushing of the webpage application according to claim 1, wherein the remote message pushing permission state is one of message pushing accepted and message pushing not accepted.

4. The method for message pushing of the webpage application according to claim 3, wherein the executing, according to the remote message pushing permission state, the message pushing operation which is in the webpage application and corresponds to the remote message pushing permission state comprises:

pushing, by the second computing device acting as the server, the message of the webpage application to the client when the remote message pushing permission state of the webpage application is message pushing accepted; or disabling, by the server when the remote message pushing permission state of the webpage application is message pushing not accepted, a function of pushing the message of the webpage application to the client.

5. The method for message pushing of the webpage application according to claim 1, wherein the client is a mobile terminal.

6. The method for message pushing of the webpage application according to claim 1, wherein the message pushed by the second computing device is displayed in the system notification bar when the browser of the client is not displayed in the foreground and the operating system is set to allow the notification bar to receive messages from the webpage application; and the pushed message is displayed in the icon of the webpage application within the browser when the browser of the client is displayed in the foreground and the operating system is set to allow the icon of the webpage application to provide the pushed message.

7. A client for message pushing of a webpage application, comprising:

processing circuitry configured to display, on a current page of the client, a permission prompt for message pushing of the webpage application, wherein the webpage application is displayed in a form of an icon;

report, to a server according to a response of a user to the permission prompt, permission state update information about message pushing of the webpage application, wherein the server maintains a remote message pushing permission state of the webpage application according to the permission state update information so as to execute a message pushing operation which is in the webpage application and corresponds to the remote message pushing permission state;

save, according to the response of the user to the permission prompt and on the client locally, an update of a local message pushing permission state of the webpage application;

check the local message pushing permission state, saved locally on the client, of the webpage application, and discard the message pushed by the webpage application when the local message pushing permission state, saved locally on the client, of the webpage application has been changed to message pushing not accepted and is inconsistent with the remote message pushing permission state maintained by the server;

display a message pushed by the server in a system notification bar of an operating system installed on the client when a browser of the client run by the operating system is not displayed in the foreground; and display the pushed message in the icon of the webpage application displayed within the browser when the browser of the client is displayed in the foreground.

8. The client according to claim 7, wherein the processing circuitry is configured to acquire the permission prompt delivered by the server; and parse the permission prompt, and display, on the current page, text content of the permission prompt and a permission button widget.

9. The client according to claim 7, wherein the remote message pushing permission state is one of message pushing accepted and message pushing not accepted.

10. The client according to claim 7, wherein the client is a mobile terminal.

11. A server for message pushing of a webpage application, comprising:

processing circuitry configured to receive permission state update information, reported by a client, for message pushing of the webpage application, wherein the webpage application is displayed in a form of an icon;

maintain a remote message pushing permission state of the webpage application on the server according to the permission state update information; and execute, according to the remote message pushing permission state, a message pushing operation which is in the webpage application and corresponds to the remote message pushing permission state, wherein the client saves, according to a response of a user to a permission prompt and on the client locally, an update of a local message pushing permission state of the webpage application;

the client checks the local message pushing permission state, saved locally on the client, of the webpage application, and discards a message pushed by the webpage application when the local message pushing permission state, saved locally on the client, of the webpage application has been changed to message pushing not accepted and is inconsistent with the remote message pushing permission state maintained by the server, the client displays the message pushed by the server in a system notification bar of an operating system installed on the client when a browser of the client run by the operating system is not displayed in the foreground; and the client displays the pushed message in the icon of the webpage application displayed within the browser when the browser of the client is displayed in the foreground.

12. The server according to claim 11, wherein the processing circuitry is configured to deliver the permission prompt for message pushing of the webpage application to the client, the response to the permission prompt indicating whether the client is to receive the message pushed by the webpage application.

\* \* \* \* \*